United States Patent
Chen et al.

(10) Patent No.: US 10,223,590 B2
(45) Date of Patent: Mar. 5, 2019

(54) METHODS AND SYSTEMS OF PERFORMING ADAPTIVE MORPHOLOGY OPERATIONS IN VIDEO ANALYTICS

(71) Applicant: QUALCOMM Incorporated, San Diego, CA (US)

(72) Inventors: Ying Chen, San Diego, CA (US); Lei Wang, Clovis, CA (US); Jinglun Gao, Milpitas, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 15/262,700

(22) Filed: Sep. 12, 2016

(65) Prior Publication Data

US 2018/0033152 A1 Feb. 1, 2018

Related U.S. Application Data

(60) Provisional application No. 62/369,600, filed on Aug. 1, 2016.

(51) Int. Cl.
*G06T 5/30* (2006.01)
*G06K 9/00* (2006.01)
(Continued)

(52) U.S. Cl.
CPC ...... *G06K 9/00711* (2013.01); *G06K 9/00771* (2013.01); *G06K 9/38* (2013.01);
(Continued)

(58) Field of Classification Search
CPC . G06T 2207/20036; G06T 5/30; G06T 7/155; G06T 7/194
See application file for complete search history.

(56) References Cited

U.S. PATENT DOCUMENTS 5,778,092 A * 7/1998 MacLeod ........... H04N 1/40062
358/426.04
5,828,776 A * 10/1998 Lee .................... G06K 9/00127
382/133

(Continued)

FOREIGN PATENT DOCUMENTS

KR 100677177 B1 2/2007
WO 2016069902 5/2016

OTHER PUBLICATIONS

Moses, D.Sammut, C. and Zrimec, T. "Automatic segmentation and analysis of the main pulmonary artery on standard post-contrast CT studies using iterative erosion and dilation," Int. J. CARS11(3), 381-395 (2016).*

(Continued)

*Primary Examiner* — Gandhi Thirugnanam
(74) *Attorney, Agent, or Firm* — Polsinelli LLP

(57) ABSTRACT

Techniques and systems are provided for processing video data. For example, techniques and systems are provided for performing content-adaptive morphology operations. A first erosion function can be performed on a foreground mask of a video frame, including setting one or more foreground pixels of the frame to one or more background pixels. A temporary foreground mask can be generated based on the first erosion function being performed on the foreground mask. One or more connected components can be generated for the frame by performing connected component analysis to connect one or more neighboring foreground pixels. A complexity of the frame (or of the foreground mask of the frame) can be determined by comparing a number of the one or more connected components to a threshold number. A second erosion function can be performed on the temporary foreground mask when the number of the one or more connected components is higher than the threshold number. The one or more connected components can be output for (Continued)

blob processing when the number of the one or more connected components is lower than the threshold number.

30 Claims, 11 Drawing Sheets

(51) Int. Cl.
G06T 5/00 (2006.01)
G06T 7/155 (2017.01)
G06T 7/194 (2017.01)
G06K 9/38 (2006.01)
G06T 7/11 (2017.01)

(52) U.S. Cl.
CPC ............... *G06T 5/004* (2013.01); *G06T 5/30* (2013.01); *G06T 7/11* (2017.01); *G06T 7/155* (2017.01); *G06T 7/194* (2017.01); *G06K 2009/00738* (2013.01); *G06T 2207/10016* (2013.01); *G06T 2207/10024* (2013.01); *G06T 2207/20012* (2013.01); *G06T 2207/20024* (2013.01); *G06T 2207/20036* (2013.01); *G06T 2207/20192* (2013.01)

(56) References Cited

U.S. PATENT DOCUMENTS

| | | | | | |
|---|---|---|---|---|---|
| 5,978,498 | A | * | 11/1999 | Wilhelm | G06K 9/00127 382/128 |
| 6,006,226 | A | * | 12/1999 | Cullen | G06F 17/3025 382/232 |
| 6,507,670 | B1 | * | 1/2003 | Moed | G06K 9/38 358/464 |
| 6,707,940 | B1 | * | 3/2004 | Qian | G06T 5/002 382/173 |
| 6,748,110 | B1 | * | 6/2004 | Wallack | G06T 7/0004 348/125 |
| 7,142,733 | B1 | * | 11/2006 | Nakagawa | G06K 9/033 382/310 |
| 7,263,227 | B2 | * | 8/2007 | Simard | G06K 9/00456 382/195 |
| 2002/0051571 | A1 | * | 5/2002 | Jackway | G06T 7/44 382/190 |
| 2003/0185420 | A1 | * | 10/2003 | Sefcik | G06K 9/3241 382/103 |
| 2004/0102247 | A1 | * | 5/2004 | Smoot | A63F 13/00 463/36 |
| 2004/0228530 | A1 | * | 11/2004 | Schwartz | G06K 9/38 382/173 |
| 2006/0291695 | A1 | * | 12/2006 | Lipton | G06K 9/00771 382/103 |
| 2007/0002151 | A1 | * | 1/2007 | Ozaki | G06T 7/0002 348/251 |
| 2007/0189615 | A1 | * | 8/2007 | Liu | G06K 9/38 382/232 |
| 2007/0217668 | A1 | * | 9/2007 | Bornemann | G06K 9/00 382/132 |
| 2009/0262977 | A1 | * | 10/2009 | Huang | G06T 7/20 382/103 |
| 2011/0243403 | A1 | * | 10/2011 | Mizuno | G06T 7/0012 382/128 |
| 2012/0219222 | A1 | * | 8/2012 | Ferman | G06K 9/3233 382/173 |
| 2013/0129170 | A1 | * | 5/2013 | Zheng | G06T 7/0079 382/131 |
| 2014/0118397 | A1 | * | 5/2014 | Lee | G06T 7/0057 345/633 |
| 2014/0169695 | A1 | * | 6/2014 | Lin | G06T 5/005 382/275 |
| 2015/0187118 | A1 | * | 7/2015 | Masumoto | A61B 6/468 345/419 |
| 2018/0033152 | A1 | * | 2/2018 | Chen | G06K 9/00711 |
| 2018/0046858 | A1 | * | 2/2018 | Chen | G06K 9/00577 |

OTHER PUBLICATIONS

Koyuncu, Can & Arslan, Salim & Durmaz Şahin, Irem & Cetin-Atalay, Rengul & Gunduz-Demir, Cigdem. (2012). Smart Markers for Watershed-Based Cell Segmentation, PloS one, p. 1-11.*
Yanwen Wu, "Software Engineering and Knowledge Engineering: Theory and Practice, vol. 1", 2012, p. 1034.*
Mark Haidekker, "Advanced Biomedical Image Analysis", 2011, John Wiley & Sons, p. 2.7.2, "https://books.google.com/books?id=uf7ao87tSyAC&pg=PT74&dq=%22iterative+erosion%22&hl=en&sa=X&ved=0ahUKEwiuuJ7C6YLbAhUnhuAKHd5RAGAQ6AEINDAC#v=onepage&q=%22iterative%20erosion%22&f=false".*
International Search Report and Written Opinion—PCT/US2017/034574—ISA/EPO—dated Oct. 4, 2017.
Mavromatis S., et al., "3D Reconstruction of Soccer Sequences Using Non-calibrated Video Cameras", Image Analysis and Recognition, 3.3 Extraction of Player Position and Foot Position, Aug. 22, 2007, XP019097812, pp. 1254-1264.
Parker J.R: "Digital Morphology" In: "Algorithms for Image Processing and Computer Vision", Jan. 1, 2010, John Wiley & Sons, ProQuest Ebook Central, XP055408828, pp. 85-136.

* cited by examiner

1100

PERFORM A FIRST EROSION FUNCTION ON A FOREGROUND MASK OF A FRAME, THE FIRST EROSION FUNCTION SETTING ONE OR MORE FOREGROUND PIXELS OF THE FOREGROUND MASK TO ONE OR MORE BACKGROUND PIXELS, WHEREIN A TEMPORARY FOREGROUND MASK IS GENERATED BASED ON THE FIRST EROSION FUNCTION BEING PERFORMED ON THE FOREGROUND MASK
1102

↓

GENERATE ONE OR MORE CONNECTED COMPONENTS BY PERFORMING CONNECTED COMPONENT ANALYSIS ON FOREGROUND PIXELS OF THE FOREGROUND MASK TO CONNECT ONE OR MORE NEIGHBORING FOREGROUND PIXELS
1104

↓

COMPARE A NUMBER OF THE ONE OR MORE CONNECTED COMPONENTS TO A THRESHOLD NUMBER
1106

↓

PERFORM A SECOND EROSION FUNCTION ON THE TEMPORARY FOREGROUND MASK WHEN THE NUMBER OF THE ONE OR MORE CONNECTED COMPONENTS IS HIGHER THAN THE THRESHOLD NUMBER, THE SECOND EROSION FUNCTION SETTING ONE OR MORE FOREGROUND PIXELS OF THE TEMPORARY FOREGROUND MASK TO ONE OR MORE BACKGROUND PIXELS
1108

FIG. 11

METHODS AND SYSTEMS OF PERFORMING ADAPTIVE MORPHOLOGY OPERATIONS IN VIDEO ANALYTICS

CROSS-REFERENCE TO RELATED APPLICATIONS

This application claims the benefit of U.S. Provisional Application No. 62/369,600, filed Aug. 1, 2016, which is hereby incorporated by reference, in its entirety.

FIELD

The present disclosure generally relates to video analytics, and more specifically to techniques and systems providing adaptive morphology operations for video analytics to more accurately detect the foreground blobs.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for providing adaptive morphology operations for blob analysis in video analytics. For example, the adaptive morphology operations are used in the generation and detection of blobs. A blob represents at least a portion of one or more objects in a video picture or frame. In some examples, using video analytics, background subtraction is applied to a picture and a foreground-background binary mask (referred to herein as a foreground mask or a foreground-background mask) is generated for the picture. Morphology operations can be applied to the foreground mask to reduce noise present in the foreground mask. Once morphology operations are applied, connected component analysis can be performed to generate the blobs. The blobs can then be provided, for example, for blob processing, object tracking, and other video analytics functions.

Examples of morphology operations include erosion functions and dilation functions. An erosion function can be used to remove pixels on object boundaries, and a dilation function can be used to enhance the boundary of a foreground object. For example, an erosion function can set one or more foreground pixels in the foreground mask to background pixels. For example, for a specific pixel, if one or more of its neighboring pixels are background pixels, this specific pixel may be set to be a background pixel. In some examples, a foreground mask is a binary image containing a 1 or 0 value indicating whether a current pixel belongs to foreground or not (e.g., a 1 value indicating a foreground pixel, a 0 value indicating a background pixel). In another example, a dilation function can set one or more background pixels in the foreground mask to foreground pixels. For example, for a specific pixel, if one or more neighboring pixels are foreground pixels, this specific pixel is set to be a foreground pixel. Erosion functions that are too strong may lead to missing blobs due to small objects being easily filtered out by the erosion. On the other hand, erosion that is too weak may cause detection of many noisy blobs and thus a lot of false positives.

The proposed systems and methods provide content-adaptive morphology operations in blob analysis and connected component analysis, allowing the video analytics to adapt to the content of frames or pictures. In some examples, a complexity level of a current frame or picture can be determined by analyzing a foreground mask for the current frame. For instance, morphology functions can be performed on the foreground mask, and the complexity level of the current frame can be determined by analyzing the foreground mask after the morphology functions are performed. The complexity level can be based on a result of connected components analysis performed after the initial set or prior set of morphology functions are applied. Based on the determined complexity level, the systems and methods can determine whether to apply an adjusted or additional morphology approach for filtering the foreground mask.

According to at least one example of performing content-adaptive morphology operations, a method of performing content-adaptive morphology operations is provided that includes performing a first erosion function on a foreground mask of a frame. The first erosion function sets one or more foreground pixels of the foreground mask to one or more background pixels. The method further includes determining a complexity of the foreground mask. The method further includes determining whether to perform one or more additional erosion functions for the frame based on the determined complexity of the foreground mask.

In another example, an apparatus is provided that includes a memory configured to store video data and a processor. The processor is configured to and can perform a first erosion function on a foreground mask of a frame. The first erosion function sets one or more foreground pixels of the foreground mask to one or more background pixels. The processor is further configured to and can determine a complexity of the foreground mask. The processor is further configured to and can determine whether to perform one or more additional erosion functions for the frame based on the determined complexity of the foreground mask.

In another example, a computer readable medium is provided having stored thereon instructions that when executed by a processor perform a method that includes: performing a first erosion function on a foreground mask of a frame, the first erosion function setting one or more foreground pixels of the foreground mask to one or more background pixels; determining a complexity of the foreground mask; and determining whether to perform one or more additional erosion functions for the frame based on the determined complexity of the foreground mask.

In another example, an apparatus is provided that includes means for means for performing a first erosion function on a foreground mask of a frame. The first erosion function sets one or more foreground pixels of the foreground mask to one or more background pixels. The apparatus further comprises means for determining a complexity of the foreground mask. The apparatus further comprises means for determining whether to perform one or more additional erosion functions for the frame based on the determined complexity of the foreground mask.

In some aspects, the methods, apparatuses, and computer readable medium described above further comprise generating one or more connected components by performing connected component analysis on foreground pixels of the foreground mask to connect one or more neighboring foreground pixels. The complexity of the foreground mask is determined by comparing a number of the one or more connected components to a threshold number.

In some aspects, the methods, apparatuses, and computer readable medium described above further comprise performing a second erosion function on a temporary foreground mask when the number of the one or more connected components is higher than the threshold number. The temporary foreground mask includes the foreground mask after the first erosion function is performed on the foreground mask. The second erosion function sets one or more foreground pixels of the temporary foreground mask to one or more background pixels.

In some aspects, the methods, apparatuses, and computer readable medium described above further comprise: generating one or more connected components using the temporary foreground mask after the second erosion function is performed; determining a complexity of the temporary foreground mask after the second erosion function is performed, the complexity of the temporary foreground mask being determined by comparing a number of the one or more connected components of the temporary foreground mask to the threshold number; determining the number of the one or more connected components of the temporary foreground mask is below the threshold number; and outputting the one or more connected components of the temporary foreground mask for blob processing, wherein a blob includes at least one connected component.

According to another example of performing content-adaptive morphology operations, a method of performing content-adaptive morphology operations is provided that includes performing a first erosion function on a foreground mask of a frame. The first erosion function sets one or more foreground pixels of the foreground mask to one or more background pixels. A temporary foreground mask is generated based on the first erosion function being performed on the foreground mask. The method further includes generating one or more connected components by performing connected component analysis on foreground pixels of the foreground mask to connect one or more neighboring foreground pixels. The method further includes comparing a number of the one or more connected components to a threshold number. The method further includes performing a second erosion function on the temporary foreground mask when the number of the one or more connected components is higher than the threshold number. The second erosion function sets one or more foreground pixels of the temporary foreground mask to one or more background pixels.

In another example, an apparatus is provided that includes a memory configured to store video data and a processor. The processor is configured to and can perform a first erosion function on a foreground mask of a frame. The first erosion function sets one or more foreground pixels of the foreground mask to one or more background pixels. A temporary foreground mask is generated based on the first erosion function being performed on the foreground mask. The processor is further configured to and can generate one or more connected components by performing connected component analysis on foreground pixels of the foreground mask to connect one or more neighboring foreground pixels. The processor is further configured to and can compare a number of the one or more connected components to a threshold number. The processor is further configured to and can perform a second erosion function on the temporary foreground mask when the number of the one or more connected components is higher than the threshold number. The second erosion function sets one or more foreground pixels of the temporary foreground mask to one or more background pixels.

In another example, a computer readable medium is provided having stored thereon instructions that when executed by a processor perform a method that includes: performing a first erosion function on a foreground mask of a frame, the first erosion function setting one or more foreground pixels of the foreground mask to one or more background pixels, wherein a temporary foreground mask is generated based on the first erosion function being performed on the foreground mask; generating one or more connected components by performing connected component analysis on foreground pixels of the foreground mask to connect one or more neighboring foreground pixels; comparing a number of the one or more connected components to a threshold number; and performing a second erosion function on the temporary foreground mask when the number of the one or more connected components is higher than the threshold number, the second erosion function setting one or more foreground pixels of the temporary foreground mask to one or more background pixels.

In another example, an apparatus is provided that includes means for performing a first erosion function on a foreground mask of a frame. The first erosion function sets one or more foreground pixels of the foreground mask to one or more background pixels. A temporary foreground mask is generated based on the first erosion function being performed on the foreground mask. The apparatus further comprises means for generating one or more connected components by performing connected component analysis on foreground pixels of the foreground mask to connect one or more neighboring foreground pixels. The apparatus further comprises means for comparing a number of the one or more connected components to a threshold number. The apparatus further comprises means for performing a second erosion function on the temporary foreground mask when the number of the one or more connected components is higher than the threshold number. The second erosion function sets one or more foreground pixels of the temporary foreground mask to one or more background pixels.

In some aspects, any of the methods, apparatuses, and computer readable mediums described above can further comprise outputting the one or more connected components for blob processing when the number of the one or more connected components is lower than the threshold number. A blob includes at least one connected component.

In some aspects, any of the methods, apparatuses, and computer readable mediums described above can further comprise: generating one or more connected components using the temporary foreground mask after the second erosion function is performed; comparing a number of the one or more connected components of the temporary foreground mask to the threshold number; determining the number of the one or more connected components of the temporary foreground mask is below the threshold number;

and outputting the one or more connected components of the temporary foreground mask for blob processing, wherein a blob includes at least one connected component.

In some aspects, any of the methods, apparatuses, and computer readable mediums described above can further include wherein performing the first erosion function includes performing a weak erosion function. The weak erosion function sets a foreground pixel of the foreground mask to a background pixel when two or more neighboring pixels of the foreground pixel include background pixels.

In some aspects, any of the methods, apparatuses, and computer readable mediums described above can further include wherein performing the first erosion function includes setting a foreground pixel of the foreground mask to a background pixel when a single neighboring pixel of the foreground pixel includes a background pixel.

In some aspects, a blob includes at least one connected component. In such aspects, any of the methods, apparatuses, and computer readable mediums described above can further include wherein only connected components of blobs smaller than a size threshold are included in the number of the one or more connected components compared to the threshold number.

In some aspects, any of the methods, apparatuses, and computer readable mediums described above can further include wherein performing the first erosion function includes performing an erosion operation on the foreground mask, and wherein performing the second erosion function includes re-performing the erosion operation on the temporary foreground mask.

In some aspects, any of the methods, apparatuses, and computer readable mediums described above can further include wherein performing the first erosion function includes performing a first erosion operation on the foreground mask, and wherein performing the second erosion function includes performing a second erosion operation on the temporary foreground mask, the first erosion operation being different than the second erosion operation.

In some aspects, any of the methods, apparatuses, and computer readable mediums described above can further comprise performing at least one dilation function on the foreground mask. The at least one dilation function sets one or more background pixels of the foreground mask to one or more foreground pixels. The at least one dilation function sets a background pixel in the foreground mask to a foreground pixel when at least one neighboring pixel of the background pixel includes a foreground pixel. In some aspects, the at least one dilation function is performed after the first erosion function is performed on the foreground mask and before the connected component analysis is performed on the foreground pixels of the foreground mask.

In some aspects, any of the methods, apparatuses, and computer readable mediums described above can further comprise performing multiple dilation functions on the foreground mask. The multiple dilation functions are performed after the first erosion function is performed on the foreground mask and before the connected component analysis is performed on the foreground pixels of the foreground mask.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 11 is a flowchart illustrating another embodiment of a process of performing content-adaptive morphology operations, in accordance with some embodiments.

DETAILED DESCRIPTION

Figure 1:
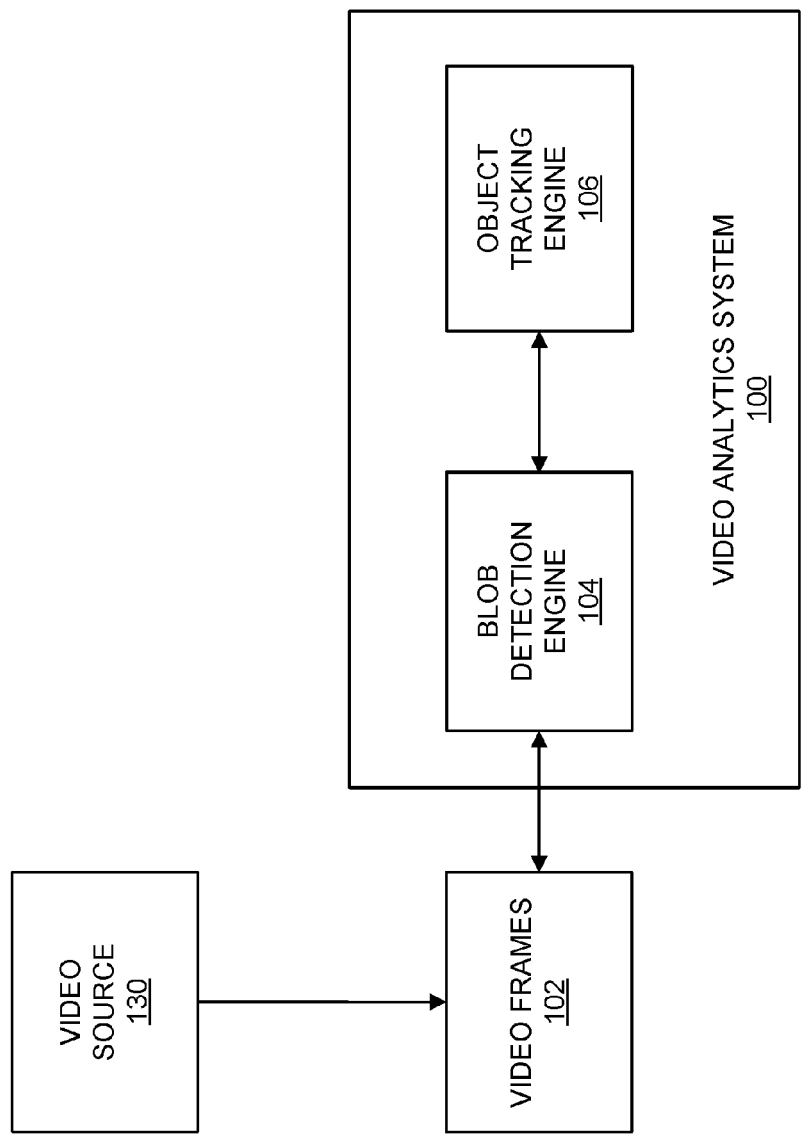
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of event of interest and sends an alert or alarm to a central control room to alert a user of the event of interest.

As noted previously, video analytics can generate and detect foreground blobs that are then used for object detection and tracking. Morphology operations can be used in the generation and detection of the blobs, but can lead to too many or too little blobs being generated depending on the strength of a morphology function being used. Systems and methods are described herein for providing content-adaptive morphology operations in blob analysis for video analytics.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding box. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box. In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the two-dimensional center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the two-dimensional center position (x and y) of a bounding box of the tracker in a previous frame. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3, 4, and 8.

Figure 2:
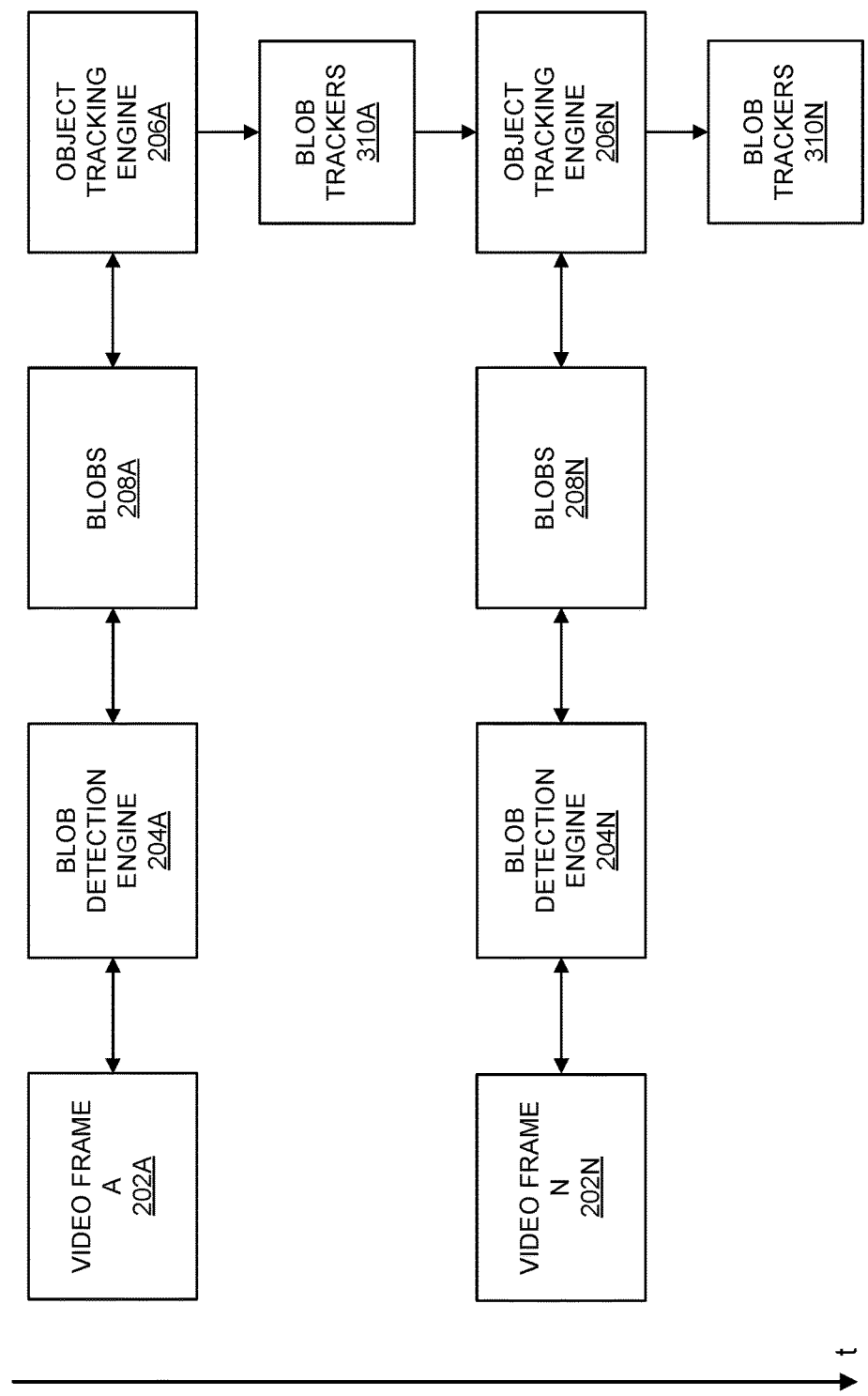
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers, including in terms of positions of the trackers, can be updated according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
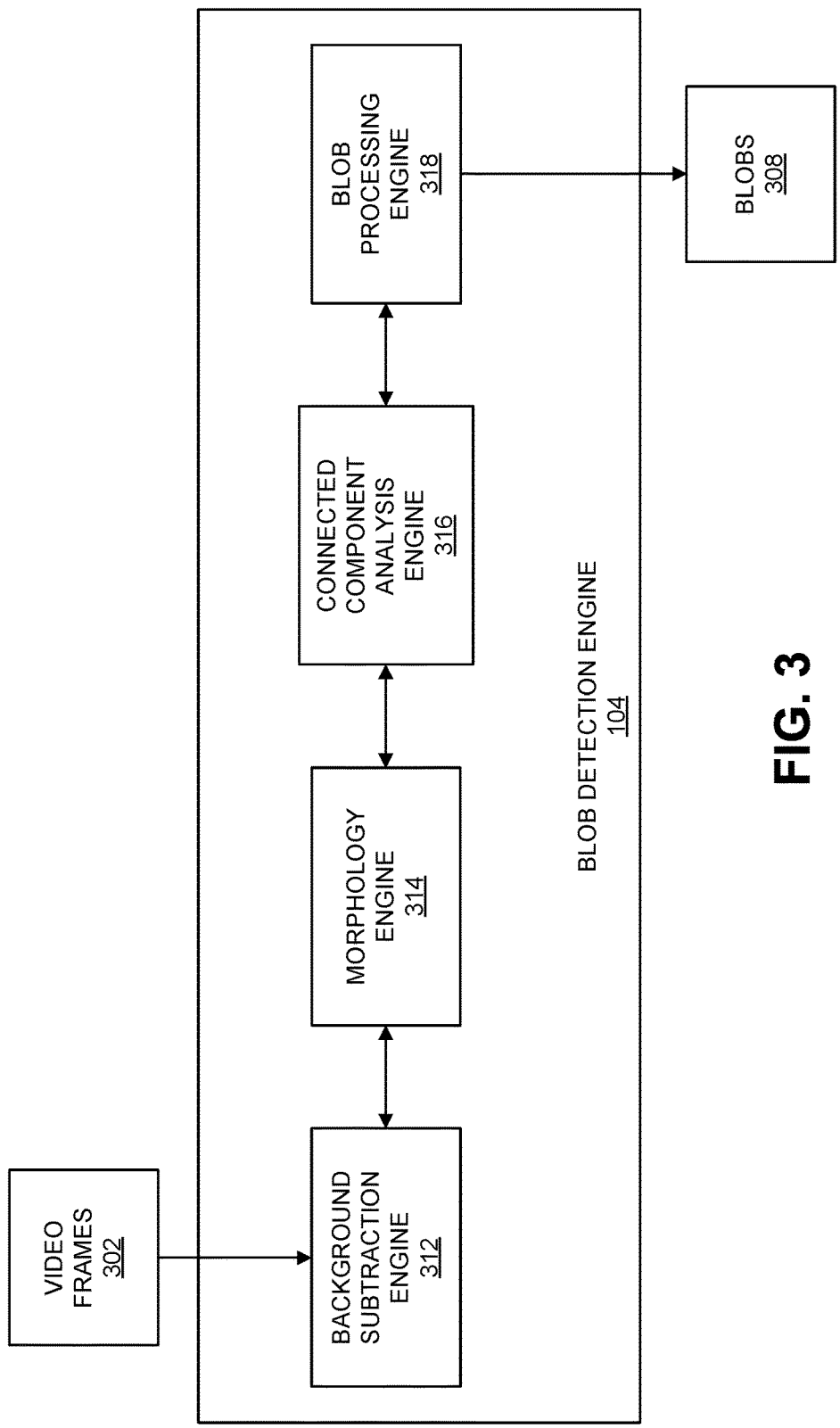
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t})$$

Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM changes over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. Examples of foreground masks are shown in FIG. 5B, FIG. 5C, FIG. 6B, FIG. 6C, FIG. 7B, and FIG. 7C. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black (as shown in FIG. 5B, FIG. 5C, FIG. 6B, FIG. 6C, FIG. 7B, and FIG. 7C).

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

for each pixel of the foreground mask {
  if it is a foreground pixel and has not been processed, the following steps apply:
    Apply FloodFill function to connect this pixel to other foreground and generate a connected component
    Insert the connected component in a list of connected component.
    Mark the pixels in the connected component as being processed The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
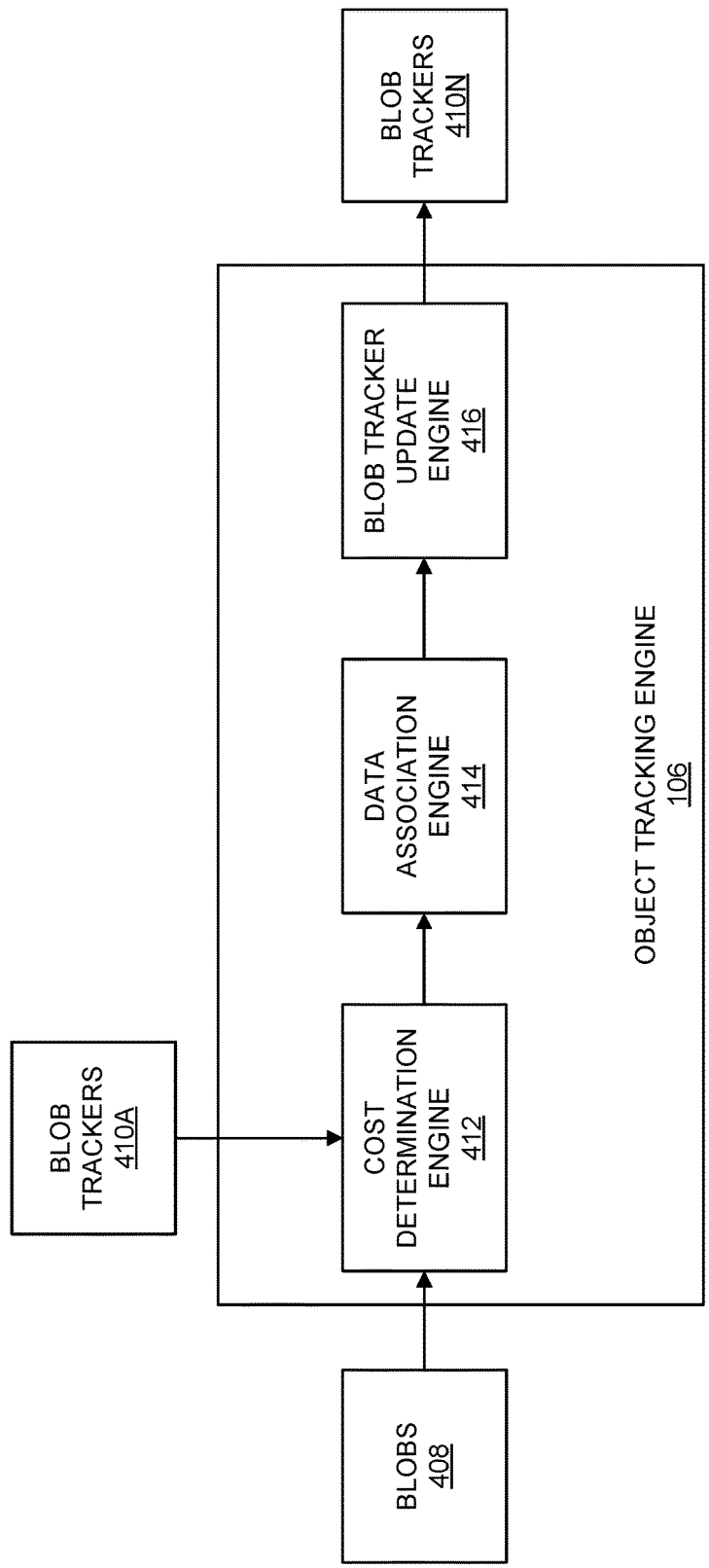
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicated from a previous frame (e.g., using a location of a blob associated with the blob tracker in the previous frame). The calculated distance between the identified blobs and estimated trackers are used for data association. After the data association for the current frame, the tracker location in the current frame can be identified with its associated blob(s)' location in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can includes the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other object of interest) intersect, the two trackers associated with the two objects will be merged together for certain frames, and the merge or occlusion status needs to be recorded for high level video analytics.

As previously described, the blob detection engine 104 can perform morphology operations to filter pixels in the foreground mask before connected component analysis, including removing pixels on object boundaries and enhancing the boundaries of object. However, simple morphology operations for blob detection may cause various problems. For example, applying an erosion function that is too strong can eliminate small objects in a picture from the foreground mask, making them invisible. A strong erosion can include an erosion that sets a foreground pixel to a background pixel when a single neighboring pixel of the foreground pixel (or other suitable number of neighboring pixels) is found to be a background pixel. A neighboring pixel can be a pixel that is one pixel away (in any direction) from the foreground pixel. In such a scenario, for instance, far objects in a large scene may not be detected as blobs because the foreground pixels of the far objects are eroded from the foreground mask (set as background pixels).

Figure 5:
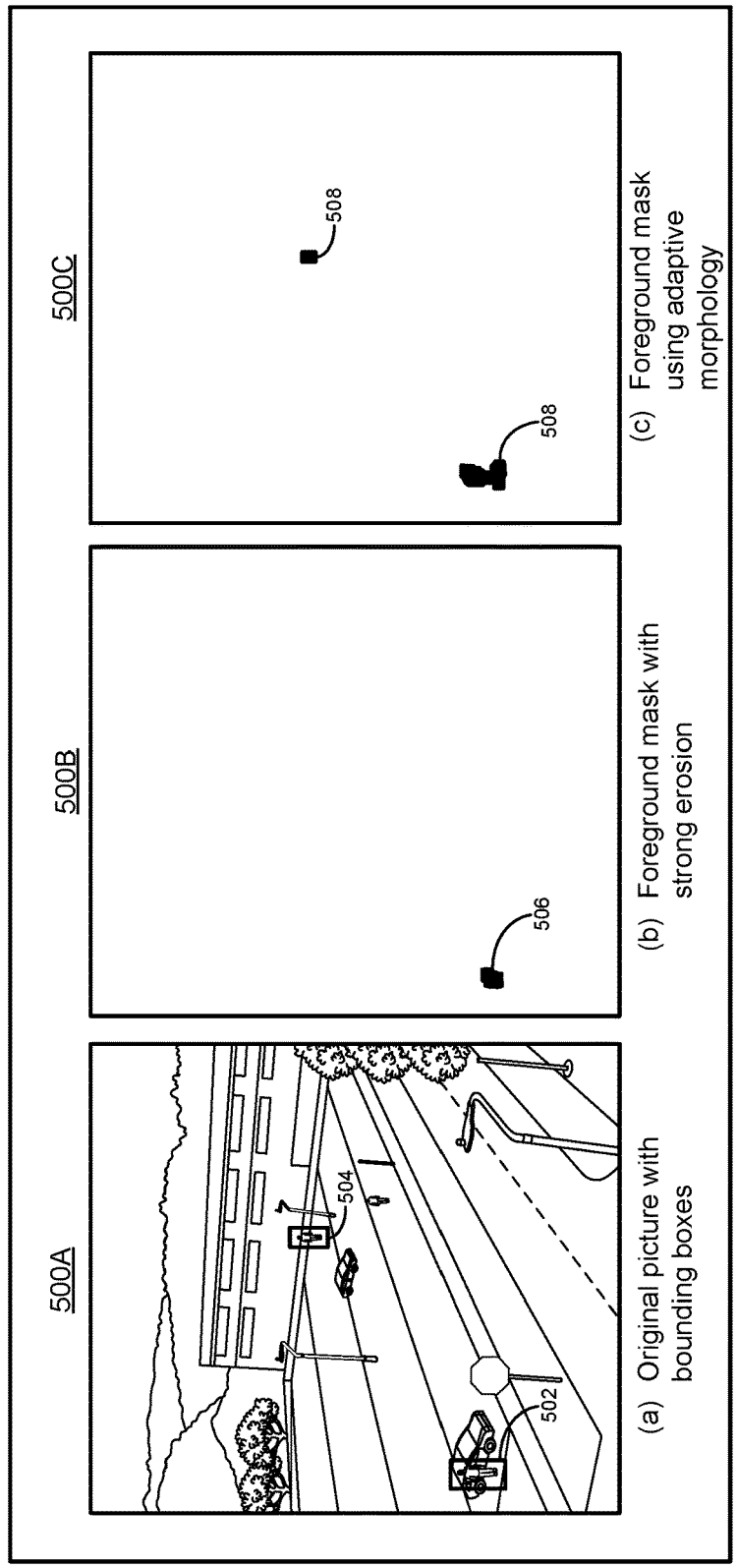
FIG. 5A is an illustration of a video picture with bounding boxes surrounding objects detected in the picture.
FIG. 5B is an illustration of a foreground mask of the picture using a strong erosion function.
FIG. 5C is an illustration of a foreground mask of the picture using content-adaptive morphology operations.

In one illustrative example shown in FIG. 5A, a scene in picture 500A covers a parking lot with several people walking in the scene (e.g., people surrounded by bounding box 502 and bounding box 504). Foreground mask 500B (FIG. 5C) and foreground mask 500C (FIG. 5C) can be generated using blob detection engine 104. However, as noted above, a strong erosion function might erode certain objects from a foreground mask, leading to the eroded objects not being detected by the blob detection engine 104. For example, as shown in FIG. 5B, the foreground pixel set 506 is generated and filtered (using morphology operations) in the foreground mask 500B for the person surrounded by bounding box 502, while the foreground pixel set 508 (shown in the foreground mask 500C) for the person surrounded by bounding box 504 is completely eroded from the foreground mask 500B. As used herein, a foreground pixel set includes a contiguous group of pixels generated in a foreground mask. For example, a foreground pixel set may be determined to be a blob by the connected component analysis engine 316.

Figure 6:
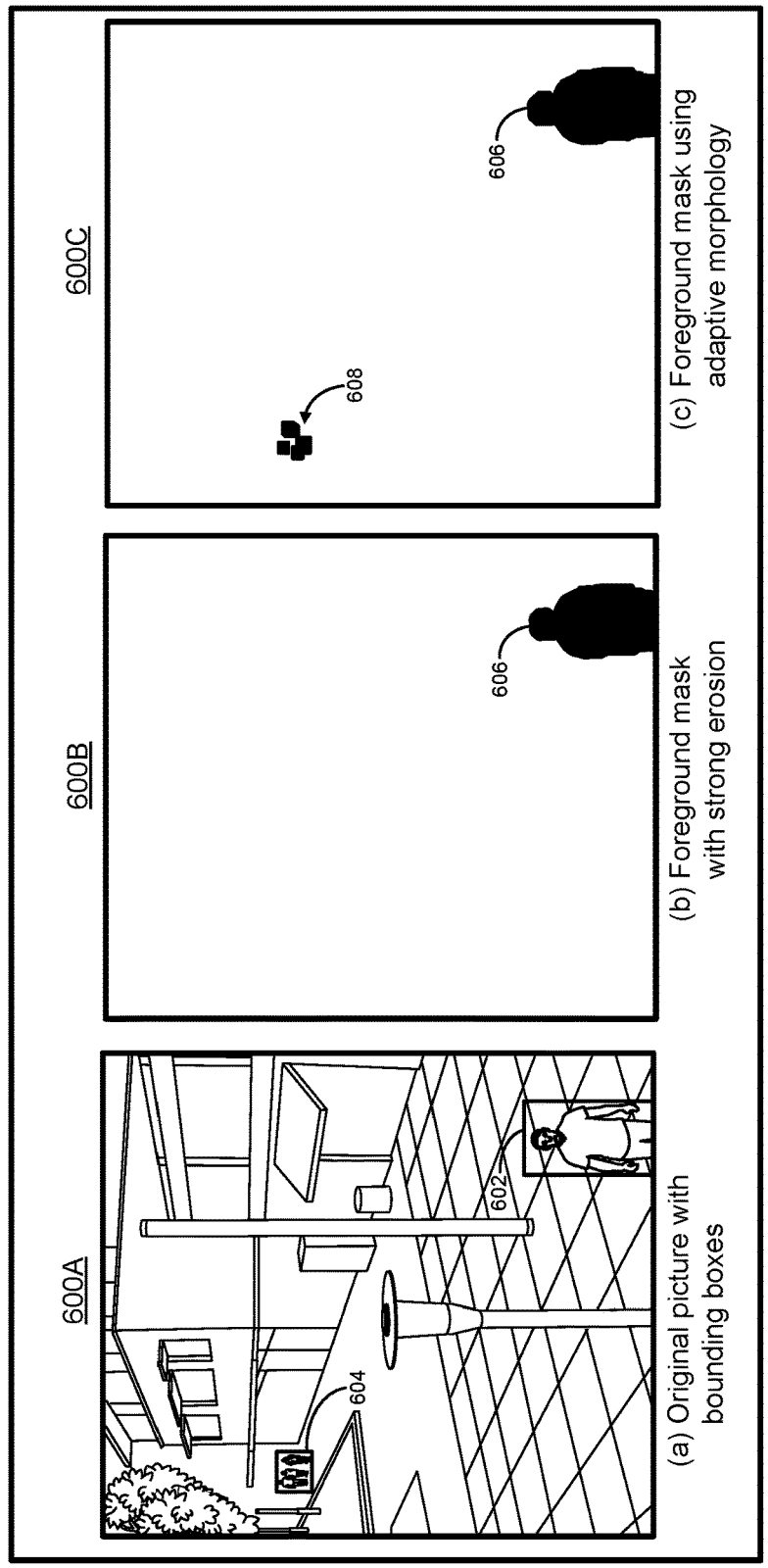
FIG. 6A is an illustration of a video picture with bounding boxes surrounding objects detected in the picture.
FIG. 6B is an illustration of a foreground mask of the picture using a strong erosion function.
FIG. 6C is an illustration of a foreground mask of the picture using content-adaptive morphology operations.

FIG. 6A shows another example of a scene in a picture 600A with a walkway and several objects, including a person surrounded by bounding box 602 and people surrounded by bounding box 604. As shown in FIG. 6B, the foreground pixel set 506 is generated and filtered in the foreground mask 600B for the person surrounded by bounding box 602. However, a strong erosion function might eliminate foreground pixel sets for the people surrounded by the bounding box 604 from the foreground mask 600B. As discussed in more detail below and shown in FIG. 5C and FIG. 6C, adaptive morphology operations can be used so that foreground pixel sets for certain objects are retained in a foreground mask, such as the foreground pixel set 508 for the person surrounding by bounding box 504 and the group of foreground pixel sets 608 for the people surrounded by bounding box 604.

Figure 7:
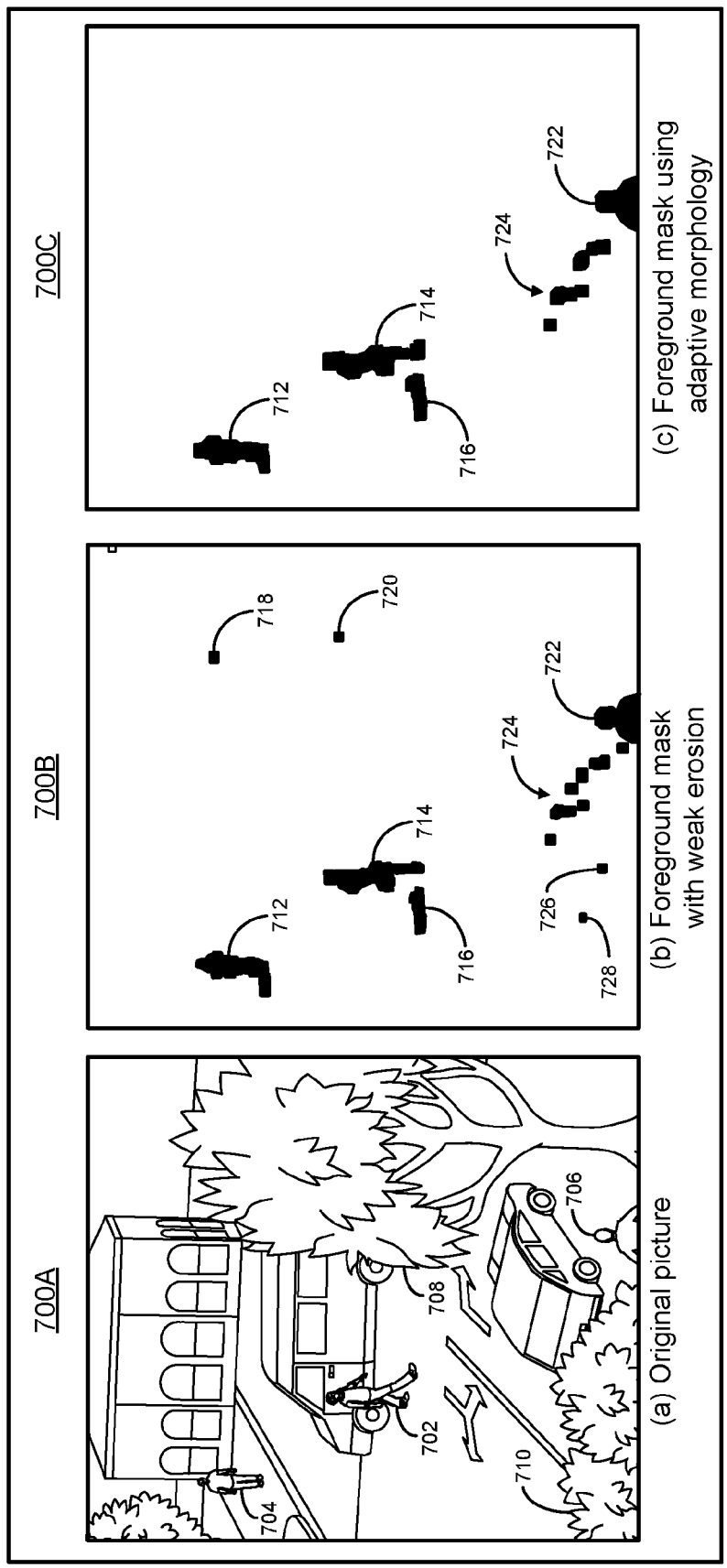
FIG. 7A is an illustration of a video picture with various foreground objects.
FIG. 7B is an illustration of a foreground mask of the picture using a weak erosion function.
FIG. 7C is an illustration of a foreground mask of the picture using content-adaptive morphology operations.

Other problems arise when an erosion function that is too weak is applied, leading to too many blobs being detected. For example, a weak erosion function may lead to too many false positive bounding boxes being output from the video analytics system in terms of object tracking. FIG. 7A shows an example of a scene in a picture 700A with a building, a parking lot, and several objects, including person 702, person 704, person 706, tree 708, and bushes 710. As shown in FIG. 7B, a large number of foreground pixel sets are generated and filtered in the foreground mask 700B, including foreground pixel set 712 for person 704, foreground pixel set 714 for person 702, foreground pixel set 716 for a shadow (not shown in picture 700A) of the person 702, foreground pixel set 722 for person 706, foreground pixel sets 718 and 720 for tree 708, and group of foreground pixel sets 724, foreground pixel set 726, and foreground pixel set 728 for bushes 710. Several of the foreground pixel sets shown in FIG. 7B are generated for objects that are in the background of the picture 700A. All or a portion of a background object can be designated as foreground pixel sets due to background noise. In some examples, background noise can occur due to slight movement of background objects or certain portions of the background objects. For example, leaves on the tree 708 might move as wind blows, leading to the foreground pixel sets 718 and 720 being generated. Similarly, leaves on the bushes 710 might move as a user walks past or as wind blows, causing generation of the foreground pixel sets 724, 726, and 728. As shown in FIG. 7B, a weak erosion might not erode the foreground pixel sets 718, 720, 724, 726, and 728 from the foreground mask 700B. As discussed in more detail below and shown in FIG. 7C, adaptive morphology operations can be used so that foreground pixel sets for certain objects are eliminated from a foreground mask.

A possible fallback or protection mechanism to prevent the generation of too many blobs can include not applying object detection or stopping object detection for the current frame. In some examples, if the capacity of the video analytics system is fixed and too many connected components are derived, the video analytics system may fail. In such examples, one solution is to stop processing the current frame to prevent failure. However, such a solution may prevent certain objects from being detected.

In some instances, if a background is too noisy, the blob processing engine 318 (or other component of the blob detection engine 104) can help reduce the number of blobs by attempting to eliminate certain blobs. For example, the blob processing engine 318 can check the size of the blobs, and can eliminate blobs smaller than a certain size threshold. However, such a method may cause several issues. In one example, a filtering process that removes small blobs can remove not only small noisy background blobs, but can also remove real foreground objects that are small (e.g., the person in the back of the parking lot surrounded by the bounding box 504 shown in FIG. 5A, the people in the rear of the picture 600A surrounded by bounding box 604 shown in FIG. 6A, or other small foreground objects). In another example, the filtering process that removes small blobs can eliminate a large percentage of noisy blobs, but many noisy blobs may remain in the foreground mask when morphology operations are not strong enough. Another disadvantage of using the blob processing engine 318 to filter blobs is that the blob processing design becomes more difficult and complex, leading to the blob processing engine 318 being less efficient.

As indicated by the various problems described above, the generation and detection of foreground blobs used for object detection and tracking is a critical yet challenging problem for video analytics. Blob detection requires morphology operations to fine-tune a foreground mask prior to connected component analysis. Erosion functions that are too strong may lead to missing blobs due to small objects being easily filtered out by the erosion. On the other hand, erosion that is too weak may cause detection of many noisy blobs and thus a lot of false positives. Accordingly, robust morphology operations are critical in generating an accurate number of blobs that represent actual foreground objects and not background noise.

The proposed systems and methods described herein provide content-adaptive morphology operations in blob analysis and connected component analysis, allowing a video analytics system to adapt to the content of frames or pictures. The content-adaptive systems and methods determine a complexity level of a current frame or picture by analyzing a foreground mask for the current frame. For example, morphology operations can be performed on the foreground mask for the current frame. The complexity level of the current frame can then be determined by analyzing the foreground mask after the morphology operations are performed. The complexity level can be based on a result of connected components analysis performed after the morphology functions are applied. Based on the determined complexity level, a more aggressive or less aggressive morphology approach is determined for use in filtering the foreground mask. For example, when a current image is determined to have a high complexity level (based on the foreground mask for that image), one or more additional morphology functions can be applied to remove more noise, resulting in less blobs being produced by the connected component analysis. The additional morphology functions can include an additional erosion function followed by one or more additional dilation functions. On the other hand, when a current image is determined to not have a high complexity level after connected component analysis is performed, blob processing can be performed without performing additional morphology functions.

Figure 8:
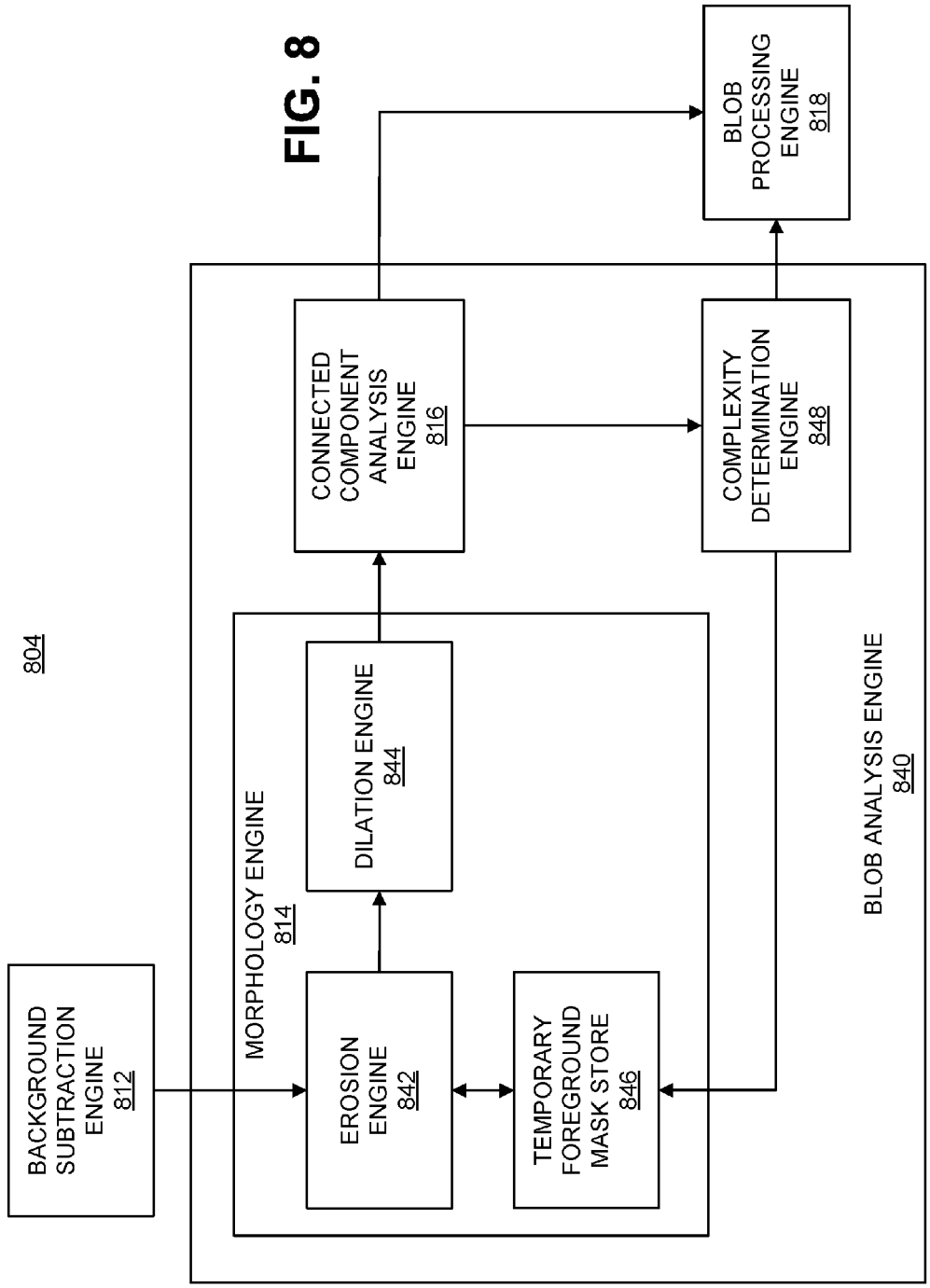
FIG. 8 is a block diagram illustrating an example of a blob detection engine using content-adaptive morphology operations, in accordance with some embodiments.

FIG. 8 is a block diagram illustrating an example of a blob detection engine 804 that can implement content-adaptive morphology operations. The blob detection engine 804 includes a background subtraction engine 812, a blob analysis engine 840, and a blob processing engine 818. The background subtraction engine 812 and the blob processing engine 818 are similar to and can perform similar operations as the background subtraction engine 312 and the blob processing engine 318, respectively, described above with respect to FIG. 3.

The blob analysis engine 840 includes a morphology engine 814, a connected component analysis engine 816, and a complexity determination engine 848. The morphology engine 814 can perform morphology functions to filter and fine-tune foreground masks received from the background subtraction engine 812. As previously described, morphology functions can include erosion functions and dilation functions. For example, the erosion engine 842 can perform an erosion function to remove foreground pixels on object boundaries, and the dilation engine 844 can perform a dilation function to enhance the boundary of a foreground object by adding foreground pixels to the boundaries. While erosion removes noise from a boundary of a blob, it can also shrink the blob. Dilation can be performed to dilate the shrunken blob, which increases the area of the blob. Because the erosion removes noise from the boundaries of the blob, the noise should not return during dilation. Dilation can also join disconnected parts of an object (connect two blobs together).

In some examples, an erosion function can be applied by the erosion engine 842, followed by a series of one or more dilation functions applied by the dilation engine 844. In one illustrative example, a single erosion function can be applied, followed by several dilation functions. In another illustrative example, instead of applying multiple dilation functions with a small window size (e.g., a 3×3 window or other similar window size), a single dilation function can be applied with a larger window (e.g., a 5×5 window, a 7×7 window, or other window size larger than 3×3).

In some embodiments, a weak erosion function can be used by the erosion engine 842. For example, instead of setting a current pixel to be background only if one of its neighboring pixels (e.g., in a 3×3 window or other window size) is a background pixel, the weak erosion function can include an erosion operation that sets the current pixel to a background pixel when d numbers of its neighboring pixels are background pixels. The number d is larger than 1 (e.g., d can be set to 2, 3, or other suitable number larger than 1). The larger the number d, the weaker the erosion function becomes due to less foreground pixels being eroded.

The filtered foreground masks (after morphology) can be sent to the connected component analysis engine 816. The connected component analysis engine 816 is similar to and can perform similar operations as the connected component analysis engine 316 described above with respect to FIG. 3. In one example, the connected component analysis engine 816 can apply connected component analysis to a foreground mask of a current frame to connect neighboring foreground pixels to formulate connected components (and thus blobs) for the current frame. For example, each determined connected component can be designated as a blob.

The blob analysis engine 840 can check the complexity level of the current frame based on the connected components. In some examples, the complexity level of the current frame can be evaluated by the number of connected components resulting from the connected component analysis. For example, the complexity determination engine 848 can obtain or determine the number of connected components for the current frame based on information from the connected component analysis engine 816. The number of connected components can be used by the complexity determination engine 848 to determine the complexity of the current frame. In some examples, the connected component analysis engine 816 can determine a number of connected components that are generated, and can output the number of the connected components to the complexity determination engine 848. In one illustrative example, during the connected component analysis process performed by the connected component analysis engine 816, a counter can be used to record the number of connected components that are generated (e.g., by counting the connected components as they are generated in real-time or near real-time). For instance, during the connected component analysis process, once a seed (the center pixel) is selected to grow to a new connected component and it terminates, the counter is updated (incremented by one). In some examples, the connected component analysis engine 816 can output the determined connected components for the current frame to the complexity determination engine 848, in which case the complexity determination engine 848 can determine the number of connected components. In either case, the complexity determination engine 848 can determine the complexity of the current image based on the number of connected components. In some examples, the connected component analysis engine 816 can perform the complexity determination, in which case the blob analysis engine 840 does not include the complexity determination engine 848.

In some embodiments, only blobs smaller than a size threshold (SIZE) are taken into consideration when determining whether the number of connected components larger than the threshold. As noted previously, in some cases, a blob can include one connected component. Therefore, the connected component of a blob smaller than the size threshold is not considered in the complexity determination. In such embodiments, connected components of blobs that are larger than the size threshold are not considered when comparing the number of connected components to the threshold. By using a size threshold, even when there is a large number of large blobs (larger than SIZE, or larger than or equal to SIZE), the connected components of the large blobs are not counted for the complexity of the current frame. In some examples, blobs smaller than or equal to the size threshold are taken into account when considering the number of connected components. In one illustrative example, when a blob is smaller than the size threshold, its connected component is considered when determining the number of connected components larger than the threshold. However, when a blob is not smaller than the size threshold, its connected component is not taken into account when determining the number of connected components larger than the threshold.

The size threshold can be set to any suitable size that effectively filters blobs that are known to belong to actual foreground objects from the complexity analysis. In some examples, the size threshold can be determined based on a typical small object size for a given scene. For example, a given scene can be analyzed to determine a typical minimum blob size for actual foreground objects. The typical minimum blob size can then be set to the size threshold. The size of a blob can be determined using one or more techniques. In one example, the size of a blob can be determined by calculating the area of a bounding box associated with the blob. In another example, the size of a blob can be determined by counting the number of pixels that make up the blob.

Based on the complexity level determined for the current frame, the blob analysis engine 840 can determine whether to output the connected components (the blobs) to the blob processing engine 818 or to perform additional morphology functions before providing the connected components to the blob processing engine 818. For example, when the complexity level of the current frame is considered to be normal (not high), the connected component analysis engine 816 or the complexity determination engine 848 can output the determined connected components (blobs) to the blob processing engine 818 for processing.

When the complexity level of the current frame is considered as high, one or more additional morphology functions can be applied to the foreground mask of the current frame to remove more noise and thus produce less connected components (and ultimately blobs). In one illustrative example, after a first erosion function and one or more dilation functions are applied to a foreground mask of a frame, connected component analysis can be performed to generate connected components. If the number of connected components is larger than a complexity threshold, a second erosion function (with a same or a different erosion operation as the previously applied erosion function) can be performed on a temporary foreground mask of the current frame, followed by one or more additional dilation functions. The temporary foreground mask can be stored in the temporary foreground mask store 846, and can be fed into the morphology engine 814. The morphology engine 814 can perform a similar process on the temporary foreground mask that was performed on the foreground mask of the original or earlier frame (e.g., the second erosion function, a second set of one or more dilation functions, and connected component analysis). In some examples, several dilation functions may be applied after the second erosion function is applied. In some examples, instead of applying multiple dilation functions with a small window size (e.g., a 3×3 window or other similar window size), a single dilation function can be applied with a larger window (e.g., a 5×5 window, a 7×7 window, or other window size larger than 3×3), which can further reduce the complexity of the temporary foreground mask.

The temporary foreground mask of the current frame is the foreground mask after the prior erosion function was performed on the current frame. For example, the temporary foreground mask can include the foreground mask after the first erosion function is applied to the foreground mask. The temporary foreground mask is used to maintain the foreground mask that has the original or earlier erosion function applied (e.g., the first erosion function). Therefore, after the complexity of the current frame is considered as large (based on the foreground mask after the first erosion function is applied), the additional morphology functions can be applied to the temporary foreground mask. Using such a temporary foreground mask allows use of less erosion functions, since the original or earlier erosion function does not need to be re-applied.

Once the additional morphology functions are applied to the temporary foreground mask of the current frame, the processed foreground mask is again fed back into the connected component analysis engine 816 to determine an updated number of connected components based on the additional morphology functions. In some embodiments, only one set of additional morphology functions are applied, in which case the processed foreground mask is fed into the connected component analysis engine 816 to provide the final connected component analysis before the connected components (blobs) are output to the blob processing engine 818.

In some embodiments, more than one round of additional morphology functions can be applied until the complexity level of the current frame is reduced (e.g., until the number of connect components is reduced to a value smaller than the complexity threshold), instead of just one round. For example, the complexity level of the frame can be checked again after the first round of additional morphology functions (e.g., after the second erosion function and additional one or more dilation functions), and a decision can be made whether to output the connected components to the blob processing engine 818 or to perform even more additional morphology functions. Using the example above, after the second erosion function, the one or more additional dilation functions, and the connected component analysis are performed, the complexity level of the additionally eroded and dilated frame can be determined. In the event the complexity level of the frame is still larger than the complexity threshold, the updated temporary foreground mask (after the second erosion function is applied) can be fed into the morphology engine 814.

In some examples, the one or more additional morphology functions that are applied in response to the complexity level being above the complexity threshold can include re-performing a morphology operation of a previously applied morphology function. For example, if the first erosion function applies a 3×3 window erosion operation that erodes foreground pixels when at least one neighboring pixel of a center pixel is a background pixel (resulting in the temporary foreground mask), the second erosion function can re-apply the same 3×3 window erosion operation to the temporary foreground mask.

In some examples, the one or more additional morphology functions can include performing a different morphology operation than that used by a previously applied morphology function (e.g., by using a weaker erosion operation than that previously applied, followed by dilation). For example, if the first erosion function applies a 3×3 window erosion operation that erodes foreground pixels when at least one neighboring pixel of a center pixel is a background pixel (resulting in the temporary foreground mask), the second erosion function can apply a different erosion operation than the 3×3 window erosion operation to the temporary foreground mask (e.g., the second erosion function can apply a weak erosion operation, as described above). In another example, a first erosion function can apply a weak erosion operation with a neighbor value d of 3, indicating that three neighbors of a center foreground pixel must be background pixels in order to set the center foreground pixel to a background pixel. In this example, the second erosion function can apply a less weak erosion operation with a neighbor value d of 2, indicating that two neighbors must be background pixels in order to set the center foreground pixel to a background pixel. By incrementally applying stronger erosion functions, more noise can be removed from the foreground mask of the current image without removing too many foreground pixels in earlier iterations.

As previously described, in some embodiments, the connected component analysis engine 816 can use a counter to count the number of connected components that have been generated. In some embodiments, if the counted number of connected components is larger than the complexity threshold, the connected component analysis engine can end the connected component process once the complexity threshold is met. For example, once the counter number becomes larger than the complexity threshold (or equal to the complexity threshold in some instances), the whole connected component analysis process for the current frame can be terminated.

The complexity threshold can be set to any suitable number of connected components that effectively indicates when a frame is complex in terms of blobs. In some examples, the complexity threshold can be determined based on a given scene. For example, a scene for which video frames are captured can be analyzed to determine a typical amount of foreground objects (blobs) that occur in the scene. In one illustrative example, a scene can include a busy parking lot in which hundreds of people, vehicles, and other objects move about. In such an example, the complexity level can be set to 100 connected components, or other suitable number. One of ordinary skill in the art will appreciate that any other suitable complexity threshold number or technique for determining the complexity threshold number can be used. In some examples, the complexity threshold can be set to a pre-determined number. In some examples, the complexity threshold can be dynamically changed based on activity in a scene (e.g., after a given number of frames, after a time period, or other interval). It is also noted that a given number of such a threshold can also work for each frame of each typical video sequence due to the nature of the additivity of the proposed method itself.

Figure 9:
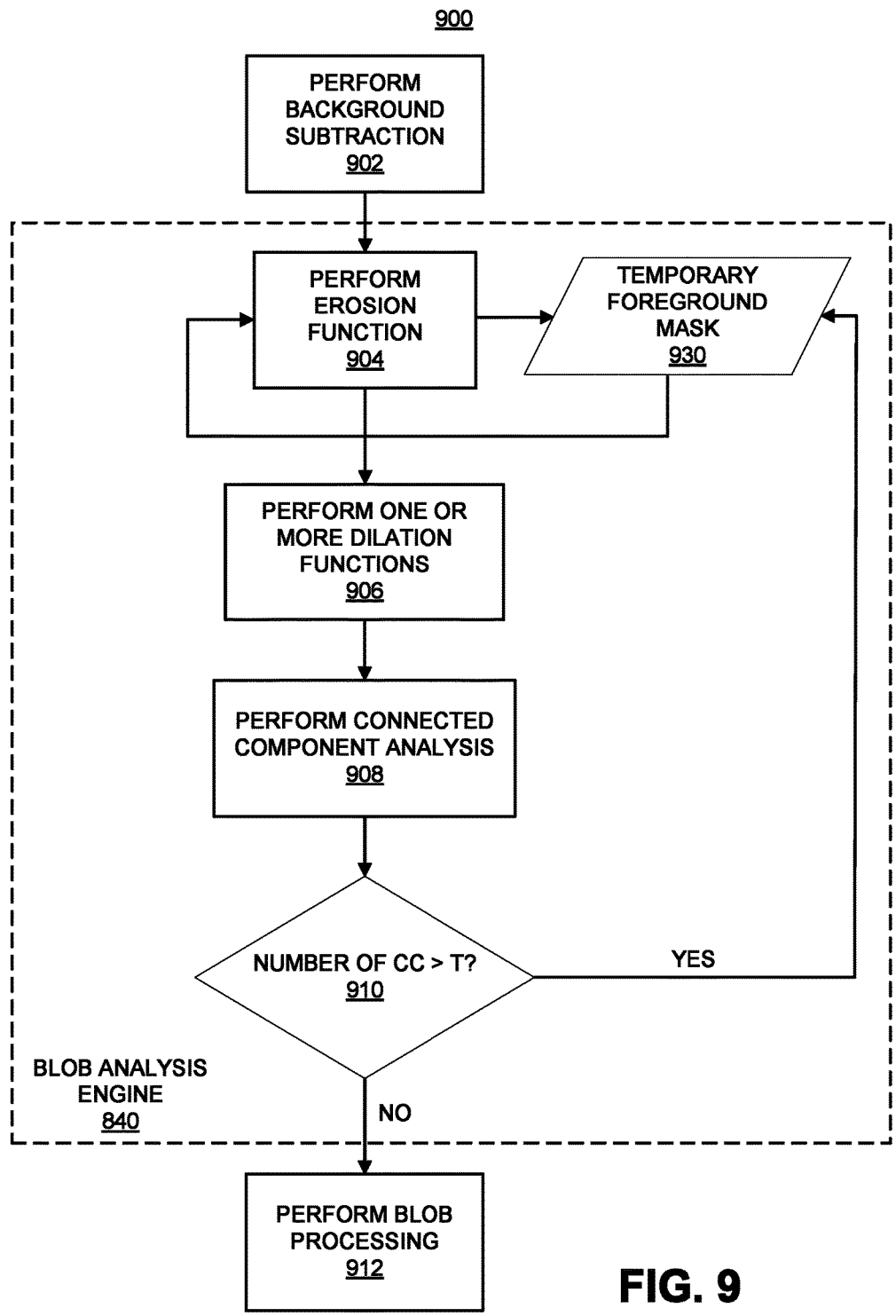
FIG. 9 is a flowchart illustrating an embodiment of a process implemented by the blob analysis engine, in accordance with some embodiments.

FIG. 9 illustrates an embodiment of a process 900 of performing the adaptive-morphology operations described above. Blob analysis typically takes a foreground mask and performs erosion and dilation, followed by a connected component analysis to derive blobs. As described above with respect to FIG. 8, the proposed systems and methods include adaptive morphology operations that implement an adaptation mechanism to check the complexity level of the current frame using the foreground mask of the current frame after erosion is applied, as evaluated by the number of connected components (NumInitialCC). If NumInitialCC is larger than a complexity threshold T, the temporary foreground mask (the foreground mask after the first or previous erosion is performed) is fed into the erosion engine 842, and similar processes are performed by the blob analysis engine 840 (erosion, dilation, and connected component analysis).

At 902, the process 900 includes performing background subtraction for a current frame. For example, the background subtraction engine 812 can perform the background subtraction using a Gaussian distribution model, a GMM, or other suitable background subtraction technique to generate a foreground mask for the current frame. The foreground mask can be provided to the morphology engine 814.

The morphology engine 814 can perform morphology functions on the foreground mask. At 904, the process includes performing an erosion function on each foreground pixel of the foreground mask. For example, the erosion engine 842 can perform a first erosion function on the foreground mask. The erosion function can include a strong erosion function (a single-neighbor erosion operation) or a weak erosion (a d-neighbor erosion operation, with d being greater than 1). The erosion engine 842 can output a temporary foreground mask 930 of the current frame to the temporary foreground mask store 846. The temporary foreground mask 930 includes the foreground mask after the first erosion function is performed.

At 906, the process 900 includes performing one or more dilation functions on the foreground mask (after the erosion is performed). For example, the dilation engine 844 can perform the one or more dilation functions on each background pixel of the foreground mask. In one illustrative example, a single erosion function can be applied at 904 for each foreground pixel of the foreground mask, and three dilation functions can be applied at 906 to each background pixel of the foreground mask. In another example, a single erosion function can be applied at 904 for each foreground pixel of the foreground mask, and a single dilation function (with an enlarged window) can be applied at 906 to each background pixel of the foreground mask.

At 908, the process 900 includes performing connected component analysis for the current frame to derive blobs. The connected component analysis engine 816 can perform the connected component analysis. The number of connected components generated for the current frame can be determined by the connected component analysis engine 816 or by the complexity determination engine 848, as described above. For example, a counter can be maintained to keep count of the number of connected components that are generated for the current frame.

The blob analysis engine 840 can then determine the complexity of the current frame. At 910, the process 900 includes comparing the number of connected components (CC) to a complexity threshold T to determine whether the number of connected components is larger than the threshold T. The connected component analysis engine 816 or the complexity determination engine 848 can compare the number of connected components to the threshold T. If the number of connected components is determined to be smaller than the threshold T (or equal to the threshold in some examples), the blobs are output. Step 912 can then be performed, including performing blob processing (e.g., including generating bounding boxes and other blob processing functions, as described above).

When the number of connected components is determined to be larger than the threshold T (or equal to the threshold in some examples), a second erosion function can be applied to the temporary foreground mask 930. The temporary foreground mask 930 can be fed into the erosion engine 842, which can perform the second erosion function to each foreground pixel of the temporary foreground mask 930. In some examples, the second erosion function can include the same erosion operation performed by the first erosion function. For example, both the first erosion function and the second erosion function can perform a strong erosion operation (a single-neighbor erosion operation) or can perform a weak erosion operation (a d-neighbor erosion operation, with d being greater than 1). For example, a weak erosion operation can be applied during both passes to ensure that small objects are detected (as shown in FIG. 5C and FIG. 6C), and the additional morphology functions (erosion and dilation functions) can be applied to remove the noisy foreground pixels for noisy video sequences with complex pictures having large numbers of connected components (as shown in 7C).

In some examples, the second erosion function can include a different erosion operation than the erosion operation performed by the first erosion function. For example, the first erosion function can perform a weak erosion operation (e.g., with d equal to 3), and the second erosion function can include a less weak erosion operation (with d equal to 2) or a strong erosion operation (a single-neighbor erosion operation).

Once the second erosion function is applied, the one or more dilation functions can be performed on the temporary foreground mask 930 at step 906, and connected component analysis can be performed on the temporary foreground mask 930 at step 908. Step 910 can be performed again to determine the complexity of the temporary foreground mask, including comparing the updated number of connected components (CC) to a threshold T to determine whether the number of connected components is larger than the threshold T.

As described above, in some embodiments, only one set of additional morphology functions can be applied, in which case the processed foreground mask is fed into the connected component analysis engine 816 to provide the final connected component analysis before the connected components (blobs) are output to the blob processing engine 818. In other embodiments, multiple rounds of additional morphology functions can be applied until the complexity level of the current frame is reduced (e.g., until the number of connect components is reduced to a value smaller than the threshold T).

Figure 10:
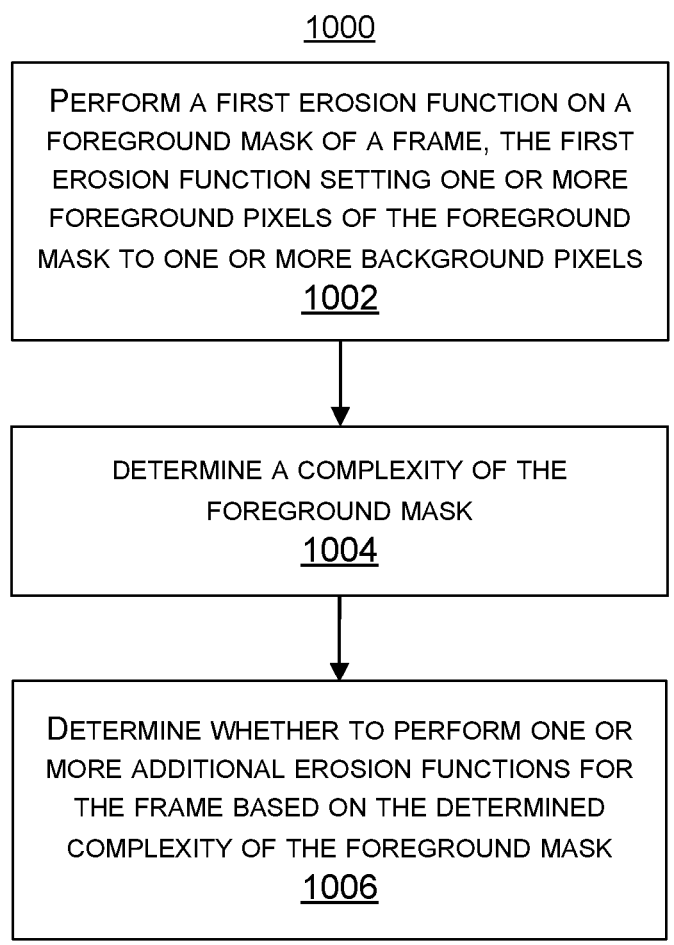
FIG. 10 is a flowchart illustrating an embodiment of a process of performing content-adaptive morphology operations, in accordance with some embodiments.

FIG. 10 illustrates an embodiment of a process 1000 of performing content-adaptive morphology operations. At 1002, the process 1000 includes performing a first erosion function on a foreground mask of a frame. The first erosion function sets one or more foreground pixels of the foreground mask to one or more background pixels.

At 1004, the process 1000 includes determining a complexity of the foreground mask. In some examples, the process 1000 further includes generating one or more connected components by performing connected component analysis on foreground pixels of the foreground mask to connect one or more neighboring foreground pixels. The one or more connected components can be generated after the first erosion function is performed. The connected component analysis can be performed by the connected component analysis engine 816. For example, connected component analysis can be applied to the foreground mask to connect neighboring foreground pixels to formulate connected components (and thus blobs) for the frame. Further, in such examples, the complexity of the foreground mask is determined by comparing a number of the one or more connected components to a threshold number. The threshold number can be determined as described above. For example, a frame (and its corresponding foreground mask) with a number of connected components higher than the threshold (or equal to in some cases) can be considered as a complex frame.

At 1006, the process 1000 includes determining whether to perform one or more additional erosion functions for the frame based on the determined complexity of the foreground mask. For example, the process 100 can perform an additional erosion function or can output the one or more connected components for blob processing based on the complexity of the foreground mask.

In some examples, the process 1000 further includes performing a second erosion function on a temporary foreground mask when the number of the one or more connected components is higher than the threshold number. The temporary foreground mask includes the foreground mask after the first erosion function is performed on the foreground mask. The second erosion function setting one or more foreground pixels of the temporary foreground mask to one or more background pixels In some examples, the process 1000 further includes outputting the one or more connected components for blob processing when the number of the one or more connected components is lower than the threshold number. As previously described, a blob includes at least one connected component. In such embodiments, the second erosion function is not performed due to the complexity level of the frame being below the threshold.

In some examples, the process 1000 further includes generating one or more connected components using the temporary foreground mask after the second erosion function is performed. In such embodiments, the process 1000 further includes determining a complexity of the temporary foreground mask after the second erosion function is performed. The complexity of the temporary foreground mask is determined by comparing a number of the one or more connected components of the temporary foreground mask to the threshold number. The process 1000 further includes determining the number of the one or more connected components of the temporary foreground mask is below the threshold number, and outputting the one or more connected components of the temporary foreground mask for blob processing. Again, a blob includes at least one connected component.

In some examples, performing the first erosion function includes performing an erosion operation on the foreground mask, and performing the second erosion function includes re-performing the erosion operation on the temporary foreground mask. In such aspects, the erosion operations of the first erosion function and the second erosion function are the same. For example, in one illustrative example, if the first erosion function applies a 3×3 window (or other size window) erosion operation that erodes foreground pixels when at least one neighboring pixel of a center pixel is a background pixel, the second erosion function can re-apply the same 3×3 window erosion operation to the temporary foreground mask. In another illustrative example, the first erosion function can apply a weak erosion operation that erodes foreground pixels when more than one neighboring pixel of a center pixel is a background pixel, and the second erosion function can also apply the same weak erosion operation to the temporary foreground mask.

In some examples, performing the first erosion function includes performing a first erosion operation on the foreground mask, and performing the second erosion function includes performing a second erosion operation on the temporary foreground mask. In such aspects, the first erosion operation is different than the second erosion operation. For example, the first erosion function can apply a 3×3 window (or other size window) erosion operation that erodes foreground pixels when at least one neighboring pixel of a center pixel is a background pixel, and the second erosion function can apply a different erosion operation, such as a weak erosion operation, a different size window, or other erosion operation. In another example, the first erosion function can apply a weak erosion operation with a neighbor value d of 3, and the second erosion function can apply a less weak erosion operation with a neighbor value d of 2. One of ordinary skill in the art will appreciate than any neighbor value d can be used.

In some aspects, a blob includes at least one connected component, and only connected components of blobs smaller than a size threshold are included in the number of the one or more connected components compared to the threshold number. The size threshold can be set to any suitable size, as described above. For example, only blobs smaller than the size threshold are taken into consideration when determining whether the number of connected components corresponding to the blobs is larger than the threshold.

In some examples, the process 1000 further includes performing at least one dilation function on the foreground mask, the at least one dilation function setting one or more background pixels of the foreground mask to one or more foreground pixels. The at least one dilation function sets a background pixel in the foreground mask to a foreground pixel when at least one neighboring pixel of the background pixel includes a foreground pixel. The at least one dilation function can be applied to the background pixels of the foreground mask associated with the frame. In some aspects, the at least one dilation function is performed after the first erosion function is performed on the foreground mask and before the connected component analysis is performed on the foreground pixels of the foreground mask.

In some aspects, the process 1000 further includes performing multiple dilation functions on the foreground mask. The multiple dilation functions are performed after the first erosion function is performed on the foreground mask and before the connected component analysis is performed on the foreground pixels of the foreground mask.

In some aspects, a single dilation function can be performed on the temporary foreground mask after the second erosion function is applied. The single dilation function can have a larger window size than the at least one dilation function performed on the foreground mask. In some aspects, multiple dilation functions can be performed on the temporary foreground mask.

In some examples, performing the first erosion function includes performing a weak erosion function. As previously described, the weak erosion function sets a foreground pixel of the foreground mask to a background pixel when two or more neighboring pixels of the foreground pixel include background pixels (with a neighbor value d greater than one).

In some examples, performing the first erosion function includes setting a foreground pixel of the foreground mask to a background pixel when a single neighboring pixel of the foreground pixel includes a background pixel.

FIG. 11 illustrates another embodiment of a process 1100 of performing content-adaptive morphology operations. At 1102, the process 1100 includes performing a first erosion function on a foreground mask of a frame. The first erosion function sets one or more foreground pixels of the foreground mask to one or more background pixels. A temporary foreground mask is generated based on the first erosion function being performed on the foreground mask. For example, the temporary foreground mask includes the foreground-background pixel designations of the foreground mask after the first erosion function is performed on the foreground mask.

At 1104, the process 1100 includes generating one or more connected components for the frame by performing connected component analysis on foreground pixels of the foreground mask to connect one or more neighboring foreground pixels. The one or more connected components are generated after the first erosion function is performed. The connected component analysis can be performed by the connected component analysis engine 816. For example, connected component analysis can be applied to the foreground mask to connect neighboring foreground pixels to formulate connected components (and thus blobs) for the frame.

At 1106, the process 1100 includes comparing a number of the one or more connected components to a threshold number. The threshold number can be determined as described above. The comparison can indicate the complexity of the foreground mask and the frame. For example, a frame (and its corresponding foreground mask) with a number of connected components higher than the threshold (or equal to in some cases) can be considered as a complex frame.

At 1108, the process 1100 includes performing a second erosion function on the temporary foreground mask when the number of the one or more connected components is higher than the threshold number. As noted above, the temporary foreground mask includes the foreground mask after the first erosion function is performed on the foreground mask. The second erosion function sets one or more foreground pixels of the temporary foreground mask to one or more background pixels.

In some examples, the process 1100 further includes outputting the one or more connected components for blob processing when the number of the one or more connected components is lower than the threshold number. As previously described, a blob includes at least one connected component. In such embodiments, the second erosion function is not performed due to the complexity level of the frame being below the threshold.

In some examples, the process 1100 further includes generating one or more connected components using the temporary foreground mask after the second erosion function is performed. The process 1100 further includes comparing a number of the one or more connected components of the temporary foreground mask to the threshold number. The comparison indicates a complexity of the temporary foreground mask after the second erosion function is performed. The process 1100 further includes determining the number of the one or more connected components of the temporary foreground mask is below the threshold number, and outputting the one or more connected components of the temporary foreground mask for blob processing. Again, a blob includes at least one connected component.

In some examples, performing the first erosion function includes performing a weak erosion function. As previously described, the weak erosion function sets a foreground pixel of the foreground mask to a background pixel when two or more neighboring pixels of the foreground pixel include background pixels (with a neighbor value d greater than one).

In some examples, performing the first erosion function includes setting a foreground pixel of the foreground mask to a background pixel when a single neighboring pixel of the foreground pixel includes a background pixel.

In some examples, a blob includes at least one connected component, and only connected components of blobs smaller than a size threshold are included in the number of the one or more connected components compared to the threshold number. The size threshold can be set to any suitable size, as described above. For example, only blobs smaller than the size threshold are taken into consideration when determining whether the number of connected components corresponding to the blobs is larger than the threshold.

In some examples, performing the first erosion function includes performing an erosion operation on the foreground mask, and performing the second erosion function includes re-performing the erosion operation on the temporary foreground mask. In such aspects, the erosion operations of the first erosion function and the second erosion function are the same. For example, in one illustrative example, if the first erosion function applies a 3×3 window (or other size window) erosion operation that erodes foreground pixels when at least one neighboring pixel of a center pixel is a background pixel, the second erosion function can re-apply the same 3×3 window erosion operation to the temporary foreground mask. In another illustrative example, the first erosion function can apply a weak erosion operation that erodes foreground pixels when more than one neighboring pixel of a center pixel is a background pixel, and the second erosion function can also apply the same weak erosion operation to the temporary foreground mask.

In some examples, performing the first erosion function includes performing a first erosion operation on the foreground mask, and performing the second erosion function includes performing a second erosion operation on the temporary foreground mask. In such aspects, the first erosion operation is different than the second erosion operation. For example, the first erosion function can apply a 3×3 window (or other size window) erosion operation that erodes foreground pixels when at least one neighboring pixel of a center pixel is a background pixel, and the second erosion function can apply a different erosion operation, such as a weak erosion operation, a different size window, or other erosion operation. In another example, the first erosion function can apply a weak erosion operation with a neighbor value d of 3, and the second erosion function can apply a less weak erosion operation with a neighbor value d of 2. One of ordinary skill in the art will appreciate than any neighbor value d can be used.

In some examples, the process 1100 further includes performing at least one dilation function on the foreground mask, the at least one dilation function setting one or more background pixels of the foreground mask to one or more foreground pixels. The at least one dilation function sets a background pixel in the foreground mask to a foreground pixel when at least one neighboring pixel of the background pixel includes a foreground pixel. The at least one dilation function can be applied to the background pixels of the foreground mask associated with the frame. In some aspects, the at least one dilation function is performed after the first erosion function is performed on the foreground mask and before the connected component analysis is performed on the foreground pixels of the foreground mask.

In some aspects, the process 1100 further includes performing multiple dilation functions on the foreground mask. The multiple dilation functions are performed after the first erosion function is performed on the foreground mask and before the connected component analysis is performed on the foreground pixels of the foreground mask.

In some aspects, a single dilation function can be performed on the temporary foreground mask after the second erosion function is applied. The single dilation function can have a larger window size than the at least one dilation function performed on the foreground mask. In some aspects, multiple dilation functions can be performed on the temporary foreground mask.

In some examples, the processes 900, 1000, and 1100 may be performed by a computing device or an apparatus, such as the video analytics system 100 or the blob detection engine 104 shown in FIG. 1, or the blob detection engine 804 shown in FIG. 8. For example, the computing device or apparatus may include a processor, microprocessor, microcomputer, or other component of a device that is configured to carry out the steps of processes 900, 1000, and 1100. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Processes 900, 1000, and 1100 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 900, 1000, and 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Using the content-adaptive morphology operations described above, small objects in a captured frame can be detected (e.g., using a weak erosion function), while noisy foreground pixels can be reduced (e.g., by applying additional morphology operations) for noisy video sequences.

The proposed method can be evaluated, for example, in an end-to-end IP camera system, where the blob/object detection rate and the blob/object tracking rate are important numbers compared with a ground truth of a traditional morphology technique. Example results of a small test set are shown below in Table 1.

| Test sequence id | Adaptive Morphology | | Simple Morphology | |
| --- | --- | --- | --- | --- |
| | detection rate | tracking rate | detection rate | tracking rate |
| 1 | 0.3653 | 0.7173 | 0.2488 | 0.5716 |
| 2 | 0.3753 | 0.7803 | 0.2174 | 0.4732 |
| 3 | 0.4665 | 0.8243 | 0.3485 | 0.7135 |
| 4 | 0.2779 | 0.4674 | 0.2348 | 0.4219 |
| 5 | 0.3824 | 0.7459 | 0.2666 | 0.6402 |
| Average | 0.37348 | 0.70704 | 0.26322 | 0.56408 |
| Comparison | 41.89% | 25.34% | | |

The proposed method can be evaluated, for example, in an end-to-end IP camera system, where the blob/object detection rate and the blob/object tracking rate are important numbers compared with a ground truth of a traditional morphology technique (e.g., a single erosion followed by multiple dilations). Example results of a small test set are shown below in Table 1.

In table 1, the test sequences with id 1 through 5 are:
VIRAT_S_010205_04_000545_000576,
    VIRAT_S_010208_08_000807_000831,
VIRAT_S_010208_02_000150_000180,
    VIRAT_S_000200_04_000937_001443, and
VIRAT_S_010206_04_000720_000767.

As shown above, the tracking rate and detection rate are significantly improved, as compared with the traditional morphology technique, with an improvement in detection rate of 41.89% and an improvement in tracking rate of 25.34%. In another example (not shown in the table) with a test of 14 sequences of various scenarios, the average improvement in detection rate is 26.69% and the tracking rate improvement is 9.85%.

The content-adaptive morphology operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of performing content-adaptive morphology operations, the method comprising:

performing a first erosion function on a foreground mask of a frame, wherein, subsequent to a background subtraction process, the foreground mask includes a binary image of foreground pixels, the first erosion function setting one or more foreground pixels of the foreground mask to one or more background pixels thereby removing the one or more foreground pixels from the foreground mask of the frame;

generating one or more connected components, wherein a connected component connects one or more neighboring foreground pixels of the foreground mask;

determining a complexity of the foreground mask, wherein the complexity of the foreground mask is based on comparing a number of connected components to a threshold number of connected components; and determining whether to perform one or more additional erosion functions for the frame based on the determined complexity of the foreground mask.

2. The method of claim 1, further comprising:

performing a second erosion function on a temporary foreground mask when the number of connected components is higher than the threshold number of connected components, the temporary foreground mask including the foreground mask after the first erosion function is performed on the foreground mask, and the second erosion function setting one or more foreground pixels of the temporary foreground mask to one or more background pixels.

3. The method of claim 2, further comprising:

generating one or more additional connected components using the temporary foreground mask after the second erosion function is performed;

determining a complexity of the temporary foreground mask after the second erosion function is performed, the complexity of the temporary foreground mask being determined by comparing a number of the one or more additional connected components to the threshold number of connected components;

determining the number of the one or more additional connected components is below the threshold number of connected components; and outputting the one or more additional connected components for blob processing, wherein a blob includes at least one connected component.

4. The method of claim 2, wherein performing the first erosion function includes performing an erosion operation on the foreground mask, and wherein performing the second erosion function includes re-performing the erosion operation on the temporary foreground mask.

5. The method of claim 2, wherein performing the first erosion function includes performing a first erosion operation on the foreground mask, and wherein performing the second erosion function includes performing a second erosion operation on the temporary foreground mask, the first erosion operation being different than the second erosion operation.

6. The method of claim 1, further comprising:

outputting the one or more connected components for blob processing when the number of connected components is lower than the threshold number of connected components, wherein a blob includes at least one connected component.

7. The method of claim 1, wherein a blob includes at least one connected component, and wherein only connected components of blobs smaller than a size threshold are included in the number of connected components compared to the threshold number of connected components.

8. The method of claim 1, further comprising:
performing at least one dilation function on the foreground mask, the at least one dilation function setting one or more background pixels of the foreground mask to one or more foreground pixels, wherein the at least one dilation function sets a background pixel in the foreground mask to a foreground pixel when at least one neighboring pixel of the background pixel includes a foreground pixel.

9. The method of claim 8, wherein the at least one dilation function is performed after the first erosion function is performed on the foreground mask and before a connected component analysis is performed on the foreground pixels of the foreground mask.

10. The method of claim 8, further comprising:
performing multiple dilation functions on the foreground mask, wherein the multiple dilation functions are performed after the first erosion function is performed on the foreground mask and before a connected component analysis is performed on the foreground pixels of the foreground mask.

11. The method of claim 1, wherein performing the first erosion function includes performing a weak erosion function, the weak erosion function setting a foreground pixel of the foreground mask to a background pixel when two or more neighboring pixels of the foreground pixel include background pixels.

12. The method of claim 1, wherein performing the first erosion function includes setting a foreground pixel of the foreground mask to a background pixel when a single neighboring pixel of includes a background pixel.

13. An apparatus comprising:
a memory configured to store video data; and
a processor configured to:
perform a first erosion function on a foreground mask of a frame, wherein, subsequent to a background subtraction process, the foreground mask includes a binary image of foreground pixels, the first erosion function setting one or more foreground pixels of the foreground mask to one or more background pixels thereby removing the one or more foreground pixels from the foreground mask of the frame;
generate one or more connected components wherein a connected component connects one or more neighboring foreground pixels of the foreground mask;
determine a complexity of the foreground mask, wherein the complexity of the foreground mask is based on comparing a number of connected components to a threshold number of connected components; and
determine whether to perform one or more additional erosion functions for the frame based on the determined complexity of the foreground mask.

14. The apparatus of claim 13, wherein the processor is further configured to:
perform a second erosion function on a temporary foreground mask when the number of connected components is higher than the threshold number of connected components, the temporary foreground mask including the foreground mask after the first erosion function is performed on the foreground mask, and the second erosion function setting one or more foreground pixels of the temporary foreground mask to one or more background pixels.

15. The apparatus of claim 14, wherein the processor is further configured to:
generate one or more additional connected components using the temporary foreground mask after the second erosion function is performed;
determine a complexity of the temporary foreground mask after the second erosion function is performed, the complexity of the temporary foreground mask being determined by comparing a number of the one or more additional connected components to the threshold number of connected components;
determine the number of the one or more additional connected components is below the threshold number of connected components; and
output the one or more additional connected components for blob processing, wherein a blob includes at least one connected component.

16. The apparatus of claim 14, wherein performing the first erosion function includes performing an erosion operation on the foreground mask, and wherein performing the second erosion function includes re-performing the erosion operation on the temporary foreground mask.

17. The apparatus of claim 14, wherein performing the first erosion function includes performing a first erosion operation on the foreground mask, and wherein performing the second erosion function includes performing a second erosion operation on the temporary foreground mask, the first erosion operation being different than the second erosion operation.

18. The apparatus of claim 13, wherein the processor is further configured to:
output the one or more connected components for blob processing when the number of connected components is lower than the threshold number of connected components, wherein a blob includes at least one connected component.

19. The apparatus of claim 13, wherein a blob includes at least one connected component, and wherein only connected components of blobs smaller than a size threshold are included in the number of connected components compared to the threshold number of connected components.

20. The apparatus of claim 13, wherein the processor is further configured to:
perform at least one dilation function on the foreground mask, the at least one dilation function setting one or more background pixels of the foreground mask to one or more foreground pixels, wherein the at least one dilation function sets a background pixel in the foreground mask to a foreground pixel when at least one neighboring pixel of the background pixel includes a foreground pixel.

21. The apparatus of claim 20, wherein the at least one dilation function is performed after the first erosion function is performed on the foreground mask and before a connected component analysis is performed on the foreground pixels of the foreground mask.

22. The apparatus of claim 20, wherein the processor is further configured to:
perform multiple dilation functions on the foreground mask, wherein the multiple dilation functions are performed after the first erosion function is performed on the foreground mask and before a connected component analysis is performed on the foreground pixels of the foreground mask.

23. The apparatus of claim 13, wherein performing the first erosion function includes performing a weak erosion function, the weak erosion function setting a foreground pixel of the foreground mask to a background pixel when two or more neighboring pixels of the foreground pixel include background pixels.

24. The apparatus of claim 13, wherein performing the first erosion function includes setting a foreground pixel of the foreground mask to a background pixel when a single neighboring pixel of the foreground pixel includes a background pixel.

25. A non-transitory computer readable medium having stored thereon instructions that when executed by a processor cause the processor to perform operations including:
  performing a first erosion function on a foreground mask of a frame, wherein, subsequent to a background subtraction process, the foreground mask includes a binary image of foreground pixels, the first erosion function setting one or more foreground pixels of the foreground mask to one or more background pixels thereby removing the one or more foreground pixels from the foreground mask of the frame;
  generating one or more connected components wherein a connected component connects one or more neighboring foreground pixels of the foreground mask;
  determining a complexity of the foreground mask, wherein the complexity of the foreground mask is based on comparing a number of connected components to a threshold number of connected components; and
  determining whether to perform one or more additional erosion functions for the frame based on the determined complexity of the foreground mask.

26. The non-transitory computer readable medium of claim 25, further comprising instructions that, when executed by a process, cause the processor to perform operations including:
  performing a second erosion function on a temporary foreground mask when the number of connected components is higher than the threshold number of connected components, the temporary foreground mask including the foreground mask after the first erosion function is performed on the foreground mask, and the second erosion function setting one or more foreground pixels of the temporary foreground mask to one or more background pixels.

27. The non-transitory computer readable medium of claim 26, further comprising instructions that, when executed by a process, cause the processor to perform operations including:
  generating one or more additional connected components using the temporary foreground mask after the second erosion function is performed;
  determining a complexity of the temporary foreground mask after the second erosion function is performed, the complexity of the temporary foreground mask being determined by comparing a number of the one or more additional connected components to the threshold number of connected components;
  determining the number of the one or more additional connected components is below the threshold number of connected components; and
  outputting the one or more additional connected components for blob processing, wherein a blob includes at least one connected component.

28. The non-transitory computer readable medium of claim 25, further comprising instructions that, when executed by a process, cause the processor to perform operations including:
  outputting connected components for blob processing when the number of connected components is lower than the threshold number of connected components, wherein a blob includes at least one connected component.

29. The non-transitory computer readable medium of claim 26, wherein performing the first erosion function includes performing an erosion operation on the foreground mask, and wherein performing the second erosion function includes re-performing the erosion operation on the temporary foreground mask.

30. The non-transitory computer readable medium of claim 26, wherein performing the first erosion function includes performing a first erosion operation on the foreground mask, and wherein performing the second erosion function includes performing a second erosion operation on the temporary foreground mask, the first erosion operation being different than the second erosion operation.

* * * * *